United States Patent [19]

Schlafer

[11] 4,373,781
[45] Feb. 15, 1983

[54] ACOUSTIC TO OPTICAL PULSE CODE MODULATING TRANSDUCER

[75] Inventor: John Schlafer, Wayland, Mass.

[73] Assignee: GTE Laboratories Incorporated, Waltham, Mass.

[21] Appl. No.: 11,290

[22] Filed: Feb. 12, 1979

[51] Int. Cl.³ .................................................. G02B 5/172
[52] U.S. Cl. ........................... 350/96.29; 250/227; 332/3; 332/14; 350/96.10; 367/163; 367/174
[58] Field of Search .............. 350/96.10, 96.17, 96.18, 350/96.29, 358; 181/150, 161, 162; 250/199, 227; 325/38 R, 43, 102, 143; 332/3, 10, 14, 26; 367/140, 163, 174

[56] References Cited

U.S. PATENT DOCUMENTS

| | | | |
|---|---|---|---|
| 3,213,197 | 10/1965 | Hawkins | 350/96.10 X |
| 3,394,976 | 7/1968 | Hawkins | 250/227 |
| 3,449,587 | 6/1969 | Barnes | 250/227 |
| 3,514,617 | 5/1970 | Klyce | 250/227 |
| 3,573,397 | 4/1971 | Sawyer et al. | 181/161 X |
| 3,941,927 | 3/1976 | Russell | 350/96.10 X |
| 4,008,390 | 2/1977 | Runge | 250/199 |
| 4,071,753 | 1/1978 | Fulenwider et al. | 250/227 |
| 4,088,885 | 5/1978 | Meslener | 250/199 |
| 4,137,060 | 1/1979 | Timmermann | 350/96.18 X |

Primary Examiner—John D. Lee
Attorney, Agent, or Firm—Fred Fisher

[57] ABSTRACT

An acoustic to optical pulse code modulating transducer includes a microphone housing. An optical fiber is supported, by suitable means coupled to the housing, at a position displaced from one end of the fiber so that the one end is oriented within the housing. Electromechanical transducing means, coupled to the housing, support a diode light source. The light source and the optical fiber are so aligned that, when the electromechanical transducing means is unexcited, light from the source is directed through the first end to the optical fiber. An acoustic diaphragm is affixed to the housing. The diaphragm is coupled to the fiber at a point between the aforesaid position and the first end. The electromechanical transducing means is excited so that the light source is vibrated along a path perpendicular to the axis of the optical fiber. The light source is suitably electrically powered. In accordance with certain features of the invention, the electromechanical transducing means is excited at a frequency higher than 20,000 cycles per second, or at a vibration frequency at least twice the maximum acoustic frequency of interest. The electromechanical transducer can be a piezoelectric bimorph bender. The first end of the fiber can be formed with a lens. The fiber can be adjustably supported in the housing.

7 Claims, 8 Drawing Figures

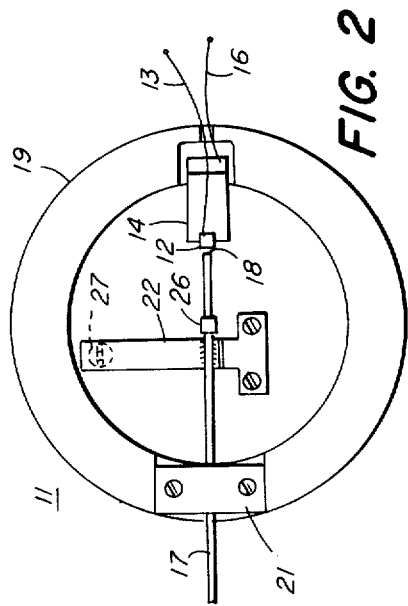
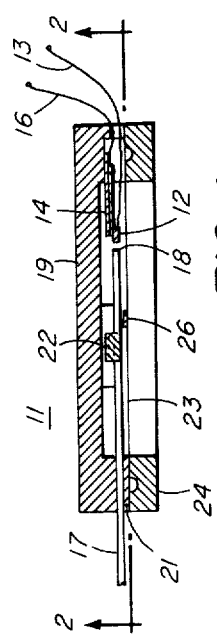
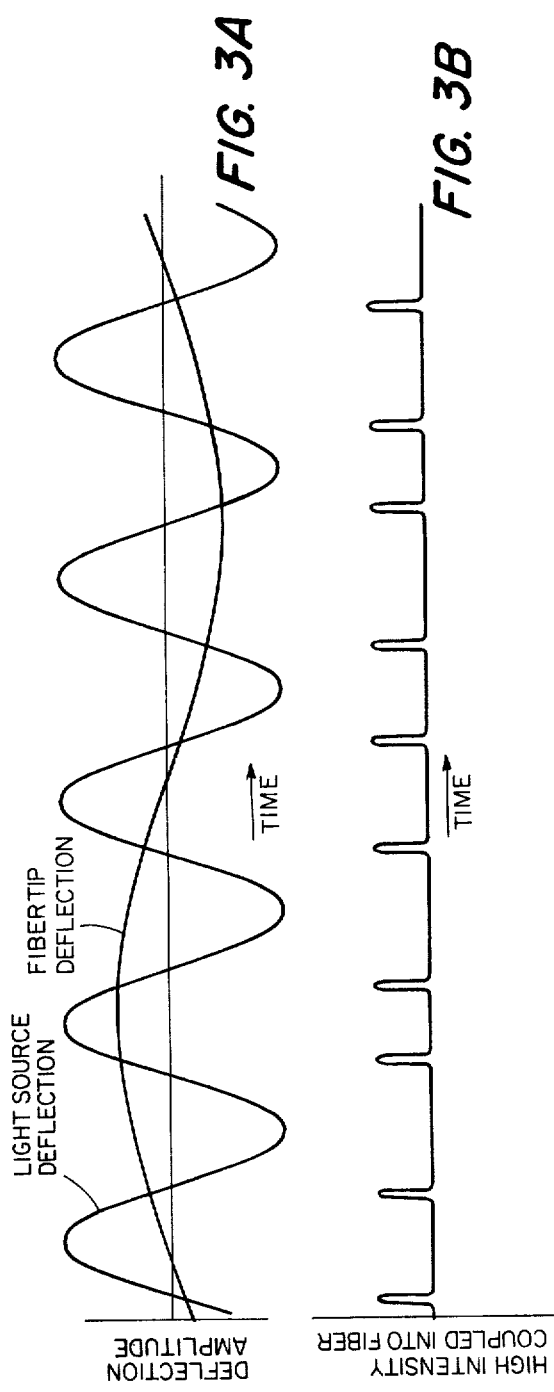

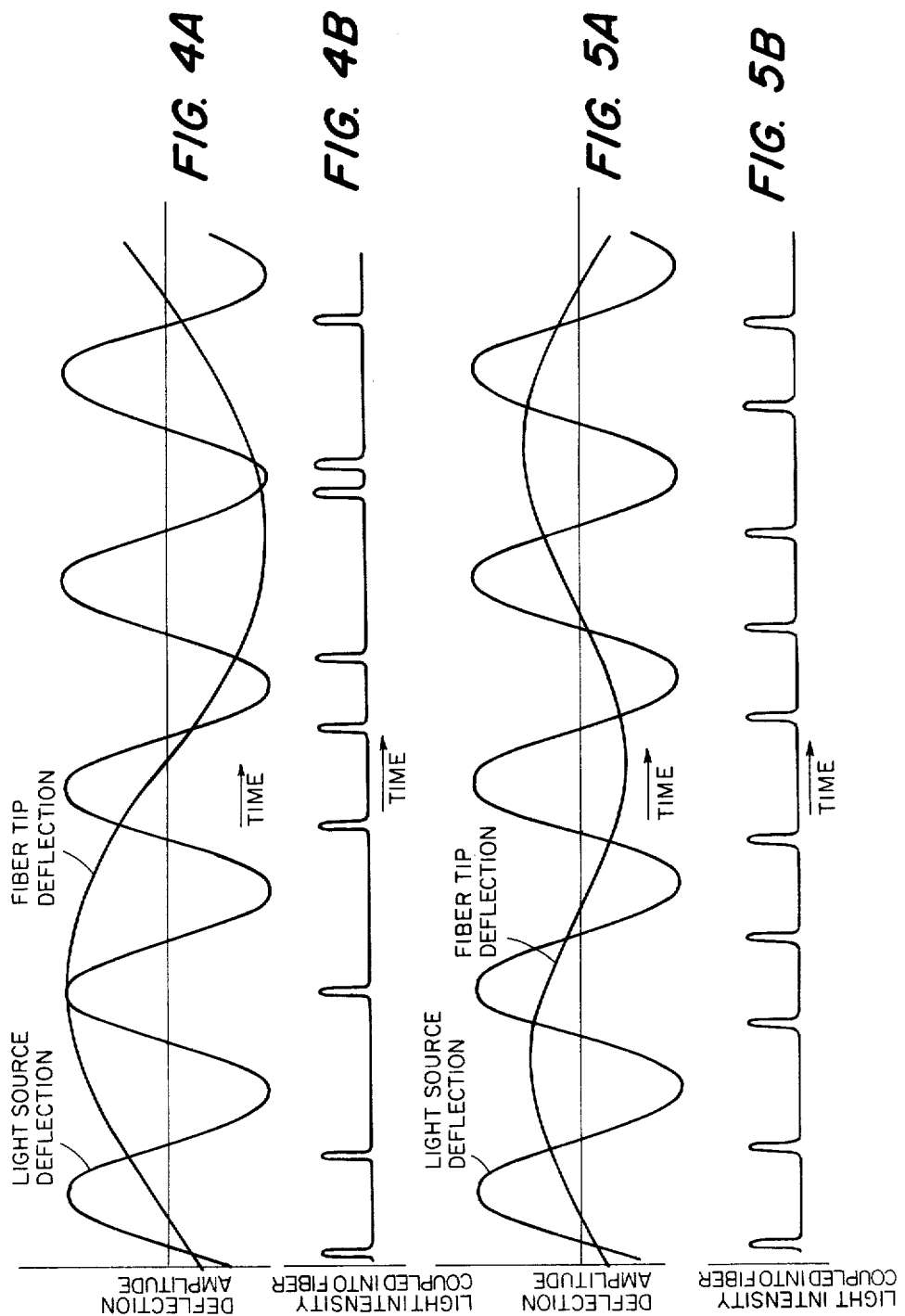

ACOUSTIC TO OPTICAL PULSE CODE MODULATING TRANSDUCER

BACKGROUND OF THE INVENTION

1. Field of the Invention

This invention relates to acoustic to optical pulse code modulating transducers, and, in particular, to means for directly pulse code modulating an optical carrier with an acoustic signal without the intermediate step of converting the acoustic signal to an electrical signal. Accordingly, it is a general object of this invention to provide new and improved transducers and means of such character.

2. Description of the Prior Art

With the rapid development of communications utilizing a light wave transmitted along an optical fiber, it is desirable to provide transducers which efficiently and conveniently convert information in the form of acoustical signals to modulation on an optical carrier.

Various apparatus of the prior art first convert the acoustic information to an electrical signal. The electrical signal is then used to modulate the optical carrier by modulation of the current drive to, and thus the light level emitted by, the optical carrier source (e.g., diode laser, light emitting diode). In some prior art devices, the electrical signal drives a modulator device external to the optical power source.

SUMMARY OF THE INVENTION

It is an object of this invention to provide a new and improved acoustic to optical pulse code modulating transducer which does not require a conversion of audio to electrical signals.

Another object of this invention is to provide new and improved acoustic to optical pulse code modulating transducers which are more economical, more efficient, simpler, and more reliable than similar devices of the prior art.

In accordance with one embodiment of this invention, an acoustic to optical pulse code modulating transducer includes a microphone housing. An optical fiber is supported, by suitable means coupled to the housing, at a position displaced from one end of the fiber so that the one end is oriented within the housing. Electromechanical transducing means, coupled to the housing, support a diode light source. The light source and the optical fiber are so aligned that, when the electromechanical transducing means is unexcited, light from the source is directed through the first end to the optical fiber. An acoustic diaphragm is affixed to the housing. The diaphragm is coupled to the fiber at a point between the aforesaid position and the first end. The electromechanical transducing means is excited so that the light source is vibrated along a path perpendicular to the axis of the optical fiber. The light source is suitably electrically powered. In accordance with certain features of the invention, the electromechanical transducing means is excited at a frequency higher than 20,000 cycles per second, or at a vibration frequency at least twice the maximum acoustic frequency of interest. The electromechanical transducer can be a piezoelectric bimorph bender. The first end of the fiber can be formed with a lens. The fiber can be adjustably supported in the housing.

BRIEF DESCRIPTION OF THE DRAWING

Other objects, advantages, and features of this invention will become more apparent from the following description, when read in conjunction with the accompanying drawing, in which FIG. 1 is a cross-sectional view of an acoustic to optical pulse code modulating transducer, in accordance with one embodiment of this invention, FIG. 2 is a cross-sectional view thereof taken along the line 2—2 of FIG. 1;

FIGS. 3A and 3B show deflection amplitude as a function of time for the light source and fiber tip, and pulses when the fiber and light source are at the same position or amplitude, respectively;

FIGS. 4A and 4B are similar to FIGS. 3A and 3B, but with a lower amplitude of oscillation for the fiber; and FIGS. 5A and 5B are similar to FIGS. 4A and 4B, but with a higher frequency of oscillation for the fiber.

DESCRIPTION OF A PREFERRED EMBODIMENT

Referring to FIGS. 1 and 2, there is shown two-cross-sectional views of a microphone housing or capsule 11. An optical carrier is generated by a diode laser or light emitting diode 12 which is biased with dc current through a lead 13. Alternatively, light can be provided via a separate optical fiber with a diode laser or light emitting diode at a remote location. The optical diode is mounted on an electromechanical transducer 14, such as a piezoelectric bimorph bender, which is driven through a lead 16 with an oscillating signal, causing it to vibrate in the plane of FIG. 1. The vibration frequency should be at least twice the maximum acoustic frequency of interest.

An optical fiber 17 is oriented so that one end thereof is adjacent to the emitting region of the diode 12. The fiber 17 preferably incorporates a lens 18 on the end to increase the optical coupling efficiency to the diode 12. The fiber 17 is held rigid with respect to a back plate 19 of the capsule 11 by a clamp plate 21. The fiber 17 is also held by bonding to an adjustment bar 22 which is mounted on the back plate 19.

A microphone diaphragm 23 is stretched and clamped to the back plate 19 by a clamp ring 24. The diaphragm 23 is coupled to the fiber 17 through a coupling pin 26. The fiber 17 is anchored to the adjustment bar 22 which is attached to the back plate 19 at one end. The other end is free and acted upon by an adjusting screw 27 so that small translating motions can be imparted to the fiber anchor point. A slot in the adjusting bar 22 near the fiber anchor point locates the pivot of the adjusting bar lever action. Adjustments are made after assembly of the capsule 11 to bring the acceptance aperture of the fiber 17 in line with the source emission when no acoustic signal is present.

The overall microphone capsule 11 enables direct conversion of acoustic signals to pulse code modulation of an optical carrier.

The diode laser 12, by being energized through the lead 13, emits light continuously. Light from the diode 12 is coupled to the optical fiber 17.

When an acoustic signal impinges on the diaphragm 23 causing it to move, the movement is coupled to the fiber 17 through the coupling pin 26. The fiber 17, acting as a lever anchored at the adjustment bar 22, transfers an amplified version of this motion to the fiber tip near the diode light source 12 where the fiber 17 moves in the plane of FIG. 1.

The deflection amplitude as a function of time for the light source 12 and fiber 17 tip are represented in FIG. 3A. At eachtime for which the fiber 17 and light source 12 are at the same position or amplitude, light is coupled into the fiber 17 and a pulse of light propagates down the fiber 17. These pulses, shown in FIG. 3B, occur at the crossover points of FIG. 3A. For a constant light source deflection amplitude and frequency, the pulse spacing is a function of the instantaneous acoustic signal amplitude represented by the fiber 17 tip deflection. Thus, the pulse positions are an encoded form of the acoustic signal, which can then be recovered at the other end of the fiber 17 using well known PCM detection schemes.

FIGS. 4A and 4B show similar waveforms, but where the amplitude of the fiber tip deflection is larger.

FIGS. 5A and 5B show similar waveforms, but with a higher frequency of fiber tip deflection.

Some features have been incorporated in the embodiment of FIGS. 1 and 2 which assist in the practical implementation of this invention. All of the electro-optical components are mounted on the back plate 19 so they are assembled and aligned before the diaphragm 23 is mounted. The cavity formed by the diaphragm 23 and back plate 19 make up an enclosure sealed from dust and moisture to protect the optical components from degradation. The coupling pin 26 is attached to the diaphragm 23 and a small amount of adhesive is applied to the tip to bond it to the fiber 17 when the diaphragm 23 is mounted on the back plate 19. When the light source 12 has an effective source size less than that of the fiber 17 acceptance aperture, the rise and fall times of the light pulses launched in the fiber 17 can be decreased by placing the source 12 at the front focal point of the lens 18 such that the ray bundle in the fiber 17 is nearly collimated. This causes more of the rays from the source 12 to reach the critical angle or acceptance angle of the fiber 17 in a shorter period of time as the source 12 sweeps by the fiber 17 ends.

In accordance with the foregoing invention, various desirable advantages are obtained:

(1) The direct conversion of acoustic signals to optical PCM signals with no intervening electrical stage.
(2) Amplifying the acoustic signal through the use of the fiber 17 as a lever.
(3) The use of a lens 18 on the end of the fiber 17 to sharpen the optical pulse edges in the fiber 17.

Various modifications can be performed by those skilled in the art without departing from the spirit and scope of this invention as defined by the appended claims.

What is claimed is:

1. An acoustic to optical pulse code modulating transducer comprising:
   an optical fiber having a first end and a second end and a central axis;
   a diode light source;
   a microphone housing;
   means coupled to said housing for supporting said fiber at a position displaced from said first end, said first end being oriented within said housing;
   means for electrically powering said light source;
   electromechanical transducing means coupled to said housing for supporting said light source,
      said light source and said optical fiber being so aligned that, when said electromechanical transducing means is unexcited, light from said source is directed through said first end to said optical fiber;
   an acoustic diaphragm affixed to said housing;
   means coupling said diaphragm to said fiber at a point between said position and said first end for transmitting acoustic frequencies thereto; and
   means for exciting said electromechanical transducing means so that said light source is vibrated along a path perpendicular to said axis.

2. The modulating transducer as recited in claim 1 wherein said electromechanical transducing means is excited at a frequency higher than 20,000 cycles per second.

3. The modulating transducer as recited in claim 1 wherein said electromechanical transducing means is excited at a vibration frequency at least twice the maximum acoustic frequency transmitted.

4. The modulating transducer as recited in claim 1 wherein said electromechanical transducer is a piezoelectric bimorph bender.

5. The modulating transducer as recited in claim 1 wherein said first end is formed with a lens.

6. The modulating transducer as recited in claim 1 further comprising means for adjusting the support of said fiber.

7. An acoustic to optical pulse code modulating transducer comprising:
   a microphone housing having a circular recess therewithin and an annular lip thereabout, said lip having a radially directed groove therewithin;
   an optical fiber having a first end and a second end and a central axis;
   means coupled to said housing for supporting said fiber along said groove; said first end being oriented within said recess;
   means coupled to said housing for supporting said fiber at a position intermediate said groove and said first end;
   a diode light source;
   means for electrically powering said light source;
   electromechanical transducing means coupled to said housing for supporting said light source,
      said light source and said optical fiber being so aligned that, when said electromechanical transducing means is unexcited, light from said source is directed through said first end to said optical fiber;
   means for exciting said electromechanical transducing means so that said light source is vibrated along a path perpendicular to said axis;
   an acoustic diaphragm;
   means for coupling said diaphragm to said fiber at a point between said position and said first end;
   a clamping ring for holding said diaphragm to said lip; and
   means for adjusting the support of said fiber.

* * * * *